(12) United States Patent
Kawano (10) Patent No.: US 12,074,524 B2
(45) Date of Patent: Aug. 27, 2024

(54) CONTROL CIRCUIT OF STEP-DOWN CONVERTER, STEP-DOWN CONVERTER, AND ELECTRONIC EQUIPMENT

(71) Applicant: ROHM Co., LTD., Kyoto (JP)

(72) Inventor: Akihiro Kawano, Kyoto (JP)

(73) Assignee: ROMM Co., LTD., Tokyo (JP)

( * ) Notice: Subject to any disclaimer, the term of this patent is extended or adjusted under 35 U.S.C. 154(b) by 220 days.

(21) Appl. No.: 17/812,753

(22) Filed: Jul. 15, 2022

(65) Prior Publication Data
US 2023/0013594 A1    Jan. 19, 2023

(30) Foreign Application Priority Data

Jul. 16, 2021  (JP) .................................. 2021-118075

(51) Int. Cl.
*H02M 3/158* (2006.01)
*H02M 1/00* (2006.01)

(52) U.S. Cl.
CPC ......... *H02M 3/1588* (2013.01); *H02M 3/158* (2013.01); *H02M 1/0022* (2021.05); *H02M 1/0032* (2021.05)

(58) Field of Classification Search
CPC ............ H02M 1/0003; H02M 1/0025; H02M 1/0029; H02M 1/0032; H02M 3/158; H02M 3/156
See application file for complete search history.

(56) References Cited

U.S. PATENT DOCUMENTS

| 10,056,822 B1* | 8/2018 | Zhang | H02M 1/14 |
| 10,476,387 B1* | 11/2019 | Xi | H02M 3/158 |
| 2013/0033248 A1* | 2/2013 | Granger | H02M 3/1588 323/288 |
| 2013/0088208 A1* | 4/2013 | Noda | H02M 3/158 323/271 |

(Continued)

*Primary Examiner* — Alex Torres-Rivera
(74) *Attorney, Agent, or Firm* — CHIP LAW GROUP (57) ABSTRACT

Provided is a control circuit of a step-down converter, the control circuit including a bottom detecting circuit that asserts a turn-on signal when an output voltage of the step-down converter falls below a bottom level, an on-time generating circuit that includes a second timer circuit capable of measuring an on-time $T_{ON}$ in such a manner that the assertion of the turn-on signal is a trigger for the measurement, and is configured to obtain a relation of $T_{ON}=\alpha \cdot V_{OUT}/V_{IN}$ when an input voltage of the step-down converter is defined as $V_{IN}$, the output voltage is defined as $V_{OUT}$, and a controllable coefficient is defined as $\alpha$, a control logic that sets a high-side transistor to an on-state during the on-time $T_{ON}$ from the assertion of the turn-on signal and subsequently sets a low-side transistor to an on-state until the turn-on signal is asserted next, and an on-time correcting circuit that decreases the coefficient $\alpha$ when a switching period of the control logic is longer than a reference period, and increases the coefficient $\alpha$ when the switching period of the control logic is shorter than the reference period.

16 Claims, 10 Drawing Sheets

(56) References Cited

U.S. PATENT DOCUMENTS

2014/0340059 A1* 11/2014 Chen .................... H02M 3/156
 323/271
2017/0163150 A1* 6/2017 Xi ........................ H02M 3/158
2021/0211048 A1* 7/2021 Yu ....................... H02M 1/0029

* cited by examiner

CONTROL CIRCUIT OF STEP-DOWN CONVERTER, STEP-DOWN CONVERTER, AND ELECTRONIC EQUIPMENT

CROSS REFERENCE TO RELATED APPLICATIONS

This application claims priority benefit of Japanese Patent Application No. JP 2021-118075 filed in the Japan Patent Office on Jul. 16, 2021. Each of the above-referenced applications is hereby incorporated herein by reference in its entirety.

BACKGROUND

The present disclosure relates to a direct-current/direct-current (DC/DC) converter (switching regulator) of the step-down type.

In various pieces of electronic equipment typified by consumer equipment such as smartphones and tablet computers, in-vehicle equipment, office automation (OA) equipment, and industrial equipment, a circuit component that requires a supply voltage lower or higher than a battery voltage or external supply voltage is mounted. In order to supply an appropriate supply voltage to such a circuit component, a step-down converter (buck converter) or step-up converter is used.

The constant on-time (COT) system is known as a control system of the step-down converter. In the COT system, a high-side transistor is turned on when an output voltage $V_{OUT}$ lowers to a certain threshold $V_{TH}$, and the on-state of the high-side transistor is kept during a constant on-period $T_{ON}$. When the on-period $T_{ON}$ ends, a low-side transistor is turned on. Thereafter, the high-side transistor is turned on again when the output voltage $V_{OUT}$ lowers to the threshold $V_{TH}$. By repeating this operation, the output voltage $V_{OUT}$ can be stabilized in a voltage range in the vicinity of the threshold voltage $V_{TH}$.

SUMMARY

In the COT system, a system in which the on-time $T_{ON}$ is controlled according to an input voltage $V_{IN}$ and the output voltage $V_{OUT}$ in order to make the switching frequency constant is known. Specifically, when a target value of the switching frequency is defined as $f_{REF}$, the switching frequency f can be stabilized by carrying out control based on the following Expression (1).

$$T_{ON}=V_{OUT}/V_{IN}\times 1/f_{REF} \quad (1)$$

The control based on Expression (1) is based on the premise that loss does not exist in the high-side transistor, the low-side transistor, and an inductor. However, actually, the high-side transistor and the low-side transistor have on-resistance, and the inductor also includes equivalent series resistance ESR. Expression (1) does not hold due to these resistance components, and an error is generated in the switching frequency f.

The present disclosure is made in such a situation, and, in a certain example thereof, it is desirable to provide a step-down converter in which the switching frequency is stabilized.

A certain example of the present disclosure relates to a control circuit of a step-down converter. The control circuit includes a bottom detecting circuit that asserts a turn-on signal when an output voltage of the step-down converter falls below a bottom level and an on-time generating circuit that includes a second timer circuit that measures an on-time $T_{ON}$ in such a manner that the assertion of the turn-on signal is a trigger for the measurement, and is configured to obtain a relation of $T_{ON}=\alpha \cdot V_{OUT}/V_{IN}$ when an input voltage of the step-down converter is defined as $V_{IN}$, the output voltage is defined as $V_{OUT}$, and a controllable coefficient is defined as $\alpha$. The control circuit also includes a control logic that sets a high-side transistor to an on-state during the on-time $T_{ON}$ from the assertion of the turn-on signal and subsequently sets a low-side transistor to an on-state until the turn-on signal is asserted next and an on-time correcting circuit that decreases the coefficient $\alpha$ when a switching period of the control logic is longer than a reference period, and increases the coefficient $\alpha$ when the switching period of the control logic is shorter than the reference period.

What are obtained by optionally combining the above constituent elements and what are obtained by mutually replacing constituent elements or representations among the method, the device, and the system are also valid as examples of the present disclosure.

According to the certain example of the present disclosure, the switching frequency of the step-down converter can be stabilized.

DETAILED DESCRIPTION OF THE PREFERRED EMBODIMENTS

Outline of Embodiments

The outline of several illustrative embodiments of the present disclosure will be described. This outline is what explains several concepts of one or multiple embodiments in a simplified manner for the purpose of basic understanding of the embodiments as an introduction of detailed explanation to be described later, and is not what limits the extent of the disclosure. This outline is not a comprehensive outline of all embodiments that are conceivable and intends to neither identify important factors of all embodiments nor delimit the range of a part or all of examples. For convenience, "one embodiment" is used as what refers to one embodiment (embodiment example or modification example) or multiple embodiments (embodiment examples or modification examples) disclosed in the present specification in some cases.

A control circuit according to one embodiment controls a step-down converter. The control circuit includes a bottom detecting circuit that asserts a turn-on signal when an output voltage of the step-down converter falls below a bottom level, and an on-time generating circuit that includes a second timer circuit that measures an on-time $T_{ON}$ in such a manner that the assertion of the turn-on signal is a trigger for the measurement, and is configured to obtain a relation of $T_{ON}=\alpha \cdot V_{OUT}/V_{IN}$ when an input voltage of the step-down converter is defined as $V_{IN}$, the output voltage is defined as $V_{OUT}$, and a controllable coefficient is defined as $\alpha$. The control circuit also includes a control logic that sets a high-side transistor to an on-state during the on-time $T_{ON}$ from the assertion of the turn-on signal and subsequently sets a low-side transistor to an on-state until the turn-on signal is asserted next, and an on-time correcting circuit that decreases a coefficient $\alpha$ when a switching period of the control logic is longer than a reference period, and increases the coefficient $\alpha$ when the switching period of the control logic is shorter than the reference period.

When a switching period $T_{SW}$ of the control logic is longer than a reference period $T_{REF}$, by decreasing the coefficient $\alpha$, the on-time $T_{ON}$ becomes shorter and, as a result, the switching period $T_{SW}$ becomes shorter and can be brought closer to the reference period $T_{REF}$. Conversely, when the switching period $T_{SW}$ of the control logic is shorter than the reference period $T_{REF}$, by increasing the coefficient $\alpha$, the on-time $T_{ON}$ becomes longer, and, as a result, the switching period $T_{SW}$ becomes longer and can be brought closer to the reference period $T_{REF}$. By carrying out this feedback control, the switching period of the control logic can be brought close to the reference period irrespective of the magnitude of the on-resistance of the high-side transistor and the low-side transistor, and the switching frequency, which is the reciprocal of the switching period, can be stabilized. This configuration has an advantage that a feedback system that involves complicated phase compensation, for example, a phase locked loop (PLL) circuit or a frequency locked loop (FLL) circuit, is unnecessary.

In one embodiment, the on-time correcting circuit may include a first timer circuit that receives a switching control signal having the switching period of the control logic and starts measurement of the reference period in such a manner that a specific edge of the switching control signal is a trigger for the start. The first timer circuit may generate a down signal when the specific edge that is next in the switching control signal occurs before the measurement of the reference period is completed, and generate an up signal when the measurement of the reference period is completed before the specific edge that is next in the switching control signal occurs. The on-time correcting circuit may change the coefficient $\alpha$ on the basis of the up signal and the down signal. According to this configuration, the on-time can be adjusted in synchronization with the switching control signal.

In one embodiment, the specific edge may be an edge corresponding to turning-on of the high-side transistor. Due to this, the on-time to be measured can be updated at the timing of measurement start of the on-time.

In one embodiment, the first timer circuit may include a ramp signal generating circuit that generates a ramp signal that has a slope and is reset in response to the specific edge of the switching control signal and a comparison circuit that generates the down signal when the ramp signal is reset before reaching a reference value corresponding to the reference period, and generates the up signal when the ramp signal reaches the reference value before being reset.

In one embodiment, the on-time correcting circuit may include an adjustment signal generating circuit that generates an adjustment signal that increases and decreases according to the up signal and the down signal, and the coefficient $\alpha$ may be controlled according to the adjustment signal.

In one embodiment, the adjustment signal generating circuit may include an up-down counter that carries out counting-up in response to the up signal and carries out counting-down in response to the down signal.

In one embodiment, the adjustment signal generating circuit may include a charge pump circuit that receives the up signal and the down signal.

In one embodiment, the second timer circuit may include a capacitor, a current source that supplies a current $Ia=\beta \cdot V_{IN}$ proportional to the input voltage $V_{IN}$ to the capacitor in such a manner that $\beta$ is a proportional constant, and a comparator that compares a voltage of the capacitor with a threshold voltage $V_{TH}$ proportional to the output voltage $V_{OUT}$. The on-time $T_{ON}$ is represented by the following Expression (2).

$$T_{ON}=C \cdot V_{TH}/Ia=C \cdot V_{TH}/(\beta \cdot V_{IN}) \quad (2)$$

Assuming that $V_{TH}=g \cdot V_{OUT}$, $$T_{ON}=C \cdot g \cdot V_{OUT}/(\beta \cdot V_{IN}) \quad (3)$$

That is, with $\alpha=C \cdot g/\beta$, the on-time $T_{ON}$ that is proportional to the output voltage $V_{OUT}$ and is inversely proportional to the input voltage $V_{IN}$ can be generated.

In one embodiment, the on-time correcting circuit may change the proportional constant $\beta$.

In one embodiment, the current source may include a voltage-current conversion circuit that includes a resistor R and generates a current $Ib=V_{IN}/R$ that is proportional to the input voltage $V_{IN}$ and is inversely proportional to a resistance value of the resistor R and a current amplifying circuit that amplifies the current Ib by a gain $\gamma$ to generate the current Ia.

In one embodiment, the resistor R may be a variable resistor, and the on-time correcting circuit may change the resistance value of the resistor R.

In one embodiment, the gain $\gamma$ of the current amplifying circuit may be variable, and the on-time correcting circuit may change the gain $\gamma$.

In one embodiment, the on-time generating circuit may include a threshold voltage generating circuit that generates the threshold voltage obtained by multiplying the output voltage $V_{OUT}$ by a gain g. The on-time correcting circuit may change the gain g.

In one embodiment, the threshold voltage generating circuit may include a filter that smoothes a switching voltage generated at a connecting node of the high-side transistor and the low-side transistor.

In one embodiment, the control circuit may be monolithically integrated on one semiconductor substrate. The "monolithically integrated" refers to a case in which all of constituent elements of the circuit are formed on the semiconductor substrate and a case in which major constituent elements of the circuit are monolithically integrated, and part of resistors, capacitors, and other circuit elements may be disposed outside the semiconductor substrate for adjustment of the circuit constant. By integrating the circuit on one chip, the circuit area can be reduced, and characteristics of circuit elements can be kept uniform.

EMBODIMENTS

The present disclosure will be described below on the basis of preferred embodiments with reference to the drawings. The same or equivalent constituent element, component, and processing illustrated in the respective drawings are given the same reference sign, and overlapping description is omitted as appropriate. Furthermore, the embodiments are not what limit the disclosure but exemplification, and all characteristics described in the embodiments and combinations thereof are not necessarily essential matters of the disclosure.

In the present specification, "a state in which Component A is connected to Component B" also includes, besides a case in which Component A and Component B are directly connected physically, a case in which Component A and Component B are indirectly connected with the interposition of another component that does not have a substantial influence on the electrical connection state of them or does not impair functions and effects provided due to the coupling of them.

Similarly, "a state in which Component C is connected between Component A and Component B" also includes, besides a case in which Component A and Component C or Component B and Component C are directly connected, a case in which Component A and Component C or Component B and Component C are indirectly connected with the interposition of another component that does not have a substantial influence on the electrical connection state of them or does not impair functions and effects provided due to the coupling of them.

Figure 1:
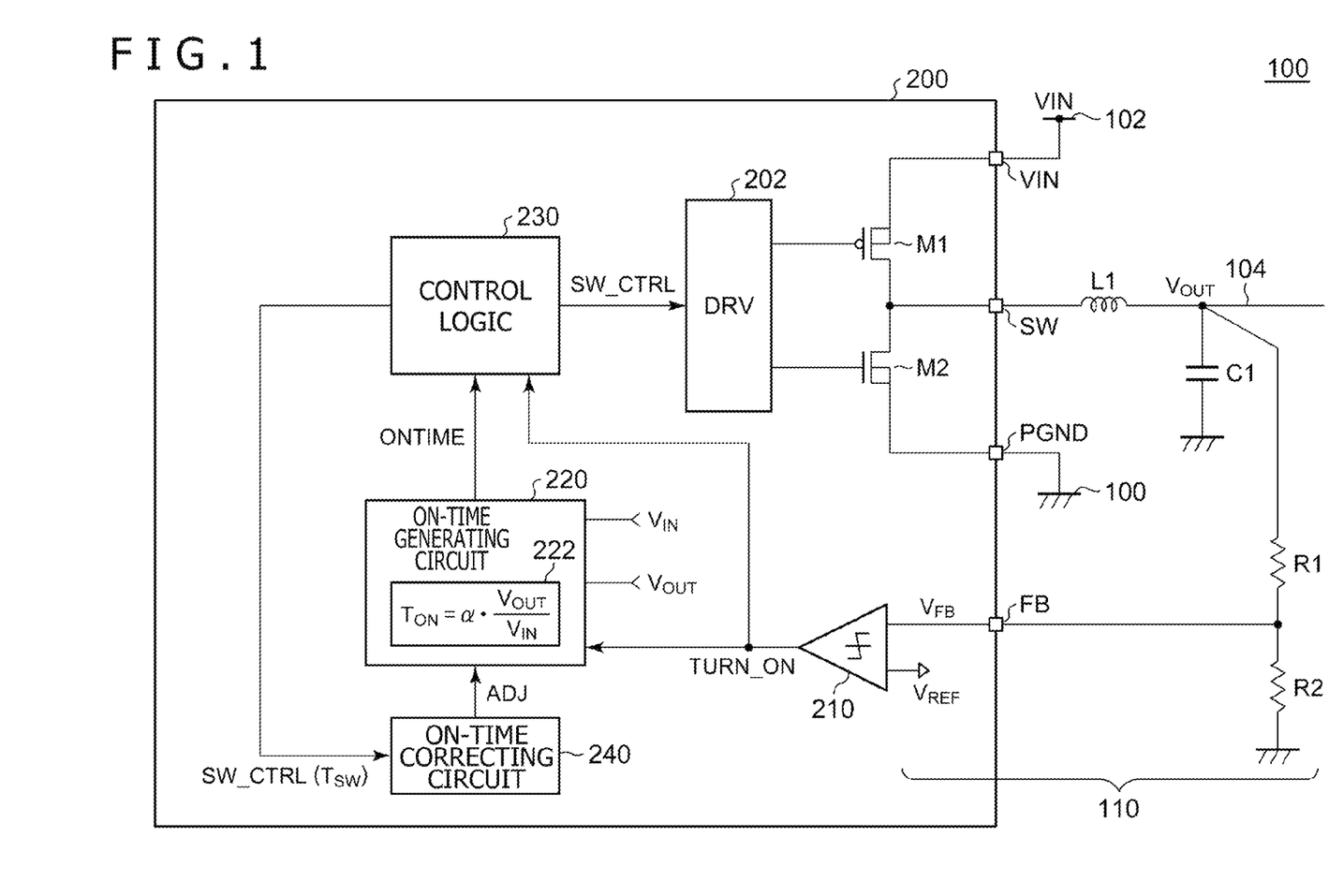
FIG. 1 is a block diagram of a step-down converter according to an embodiment.

FIG. 1 is a block diagram of a step-down converter 100 according to an embodiment. The step-down converter 100 receives the direct-current input voltage $V_{IN}$ at an input line 102 and supplies the output voltage $V_{OUT}$ with a lower voltage level than the input voltage $V_{IN}$ to a load connected to an output line 104. The step-down converter 100 is a constant voltage output type that stabilizes the output voltage $V_{OUT}$ to a target level $V_{OUT(REF)}$.

The step-down converter 100 includes a control integrated circuit (IC) 200 and a main circuit 110 thereof. The step-down converter 100 is a synchronous rectification type, and the main circuit 110 includes an inductor L1, an output capacitor C1, resistors R1 and R2, a high-side transistor M1, and a low-side transistor M2.

The control IC 200 controls the step-down converter 100 (main circuit 110) and stabilizes the output voltage $V_{OUT}$ to the target level $V_{OUT(REF)}$ thereof.

The control IC 200 is a functional IC integrated on one semiconductor substrate and includes an input pin (referred to also as a terminal) $V_{IN}$, a switching pin SW, a ground pin PGND, and a feedback pin FB. The input pin $V_{IN}$ is connected to the input line 102 and is supplied with the input voltage $V_{IN}$. The external inductor L1 is connected to the switching pin SW, and the ground pin PGND is grounded. To the feedback pin FB, a feedback signal $V_{FB}$ based on the output voltage $V_{OUT}$ of the step-down converter 100 is input. For example, the feedback signal $V_{FB}$ is a voltage signal obtained by dividing the output voltage $V_{OUT}$ by the resistors R1 and R2.

The control IC 200 includes a bottom detecting circuit 210, an on-time generating circuit 220, a control logic 230, an on-time correcting circuit 240, and a driver circuit 202 in addition to the high-side transistor M1 and the low-side transistor M2, which are part of the main circuit 110.

The high-side transistor M1 is connected between the input pin VIN and the switching pin SW, and the low-side transistor M2 is connected between the switching pin SW and the ground pin PGND.

The high-side transistor M1 and the low-side transistor M2 may be discrete elements disposed outside the control IC 200. Furthermore, the high-side transistor M1 and the low-side transistor M2 may be insulated gate bipolar transistors (IGBT) or bipolar transistors.

The high-side transistor M1 may be the N-type (i.e. N-channel or negative-positive-negative (NPN) type). In this case, a bootstrap circuit is added.

The bottom detecting circuit 210 asserts (for example, high) a turn-on signal TURN_ON when the output voltage $V_{OUT}$ of the step-down converter 100 falls below a bottom level $V_{BOTTOM}$. The feedback signal $V_{FB}$ that indicates the output voltage $V_{OUT}$ and a reference voltage $V_{REF}$ are input to the bottom detecting circuit 210. The bottom detecting circuit 210 is configured to assert the turn-on signal TURN_ON when the feedback signal $V_{FB}$ lowers to the bottom level $V_{BOTTOM}$ based on the reference voltage $V_{REF}$.

The configuration of the bottom detecting circuit 210 is not particularly limited. For example, the reference voltage $V_{REF}$ may be used as the bottom level $V_{BOTTOM}$ as it is. In this case, the bottom detecting circuit 210 may include a voltage comparator that compares the feedback signal $V_{FB}$ with the reference voltage $V_{REF}$.

Alternatively, the bottom detecting circuit 210 may include an error amplifier and a voltage comparator. The error between the feedback signal $V_{FB}$ and the reference voltage $V_{REF}$ may be amplified to generate the bottom level $V_{BOTTOM}$ by the error amplifier at the former stage. The feedback signal $V_{FB}$ may be compared with the bottom level $V_{BOTTOM}$ generated by the error amplifier by the voltage comparator at the latter stage.

The on-time generating circuit 220 includes a second timer circuit 222 that measures the on-time $T_{ON}$ in such a manner that the assertion of the turn-on signal TURN_ON is the trigger for the measurement. Signals that indicate the input voltage $V_{IN}$ and the output voltage $V_{OUT}$ are input to the second timer circuit 222, and the on-time $T_{ON}$ measured by the second timer circuit 222 is represented by Expression (4) with use of the controllable coefficient α.

$$T_{ON} = \alpha \cdot V_{OUT}/V_{IN} \qquad (4)$$

The on-time generating circuit 220 outputs an on-time ONTIME that indicates the elapse of the on-time $T_{ON}$. The on-time ONTIME may be a pulse signal that is at a high level during the on-time $T_{ON}$ or may be a signal that indicates the end of the on-time $T_{ON}$. As described later, a is variable according to an adjustment signal ADJ generated by the on-time correcting circuit 240.

The control logic 230 makes an on-state in which the high-side transistor M1 is ON and the low-side transistor M2 is OFF during the on-time $T_{ON}$ from assertion of the turn-on signal TURN_ON, and subsequently makes an off-state in which the high-side transistor M1 is OFF and the low-side transistor M2 is ON until the turn-on signal TURN_ON is asserted next. The control logic 230 generates a switching control signal SW_CTRL that indicates the on-state and the off-state. The driver circuit 202 drives the high-side transistor M1 and the low-side transistor M2 according to the switching control signal SW_CTRL.

A signal that indicates the switching period $T_{SW}$ of the control logic 230 is input to the on-time correcting circuit 240. For example, to the on-time correcting circuit 240, the switching control signal SW_CTRL may be input, or a gate signal of the high-side transistor M1 or a gate signal of the low-side transistor M2 may be input.

The on-time correcting circuit 240 acts on the on-time generating circuit 220 in such a manner as to decrease the coefficient α when the switching period $T_{SW}$ is longer than the reference period $T_{REF}$ and increase the coefficient α when the switching period $T_{SW}$ of the control logic 230 is shorter than the reference period $T_{REF}$. The on-time correcting circuit 240 generates the adjustment signal ADJ for controlling the coefficient α.

The above is the configuration of the step-down converter 100. Subsequently, operation thereof will be described.

Figure 2:
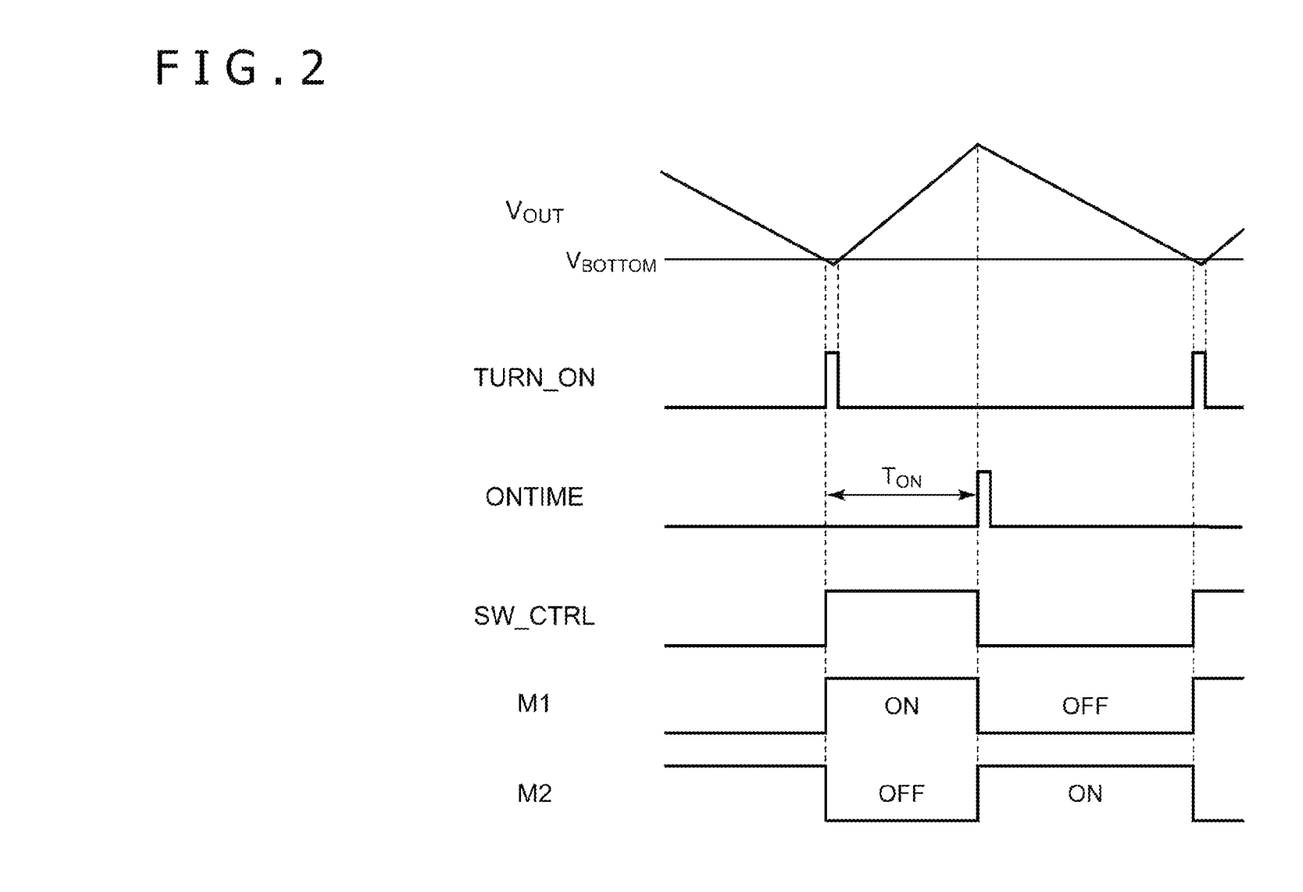
FIG. 2 is a waveform diagram for explaining basic operation of the step-down converter of FIG. 1.

FIG. 2 is a waveform diagram for explaining basic operation of the step-down converter 100 of FIG. 1. In FIG. 2, states of the output voltage $V_{OUT}$, the turn-on signal TURN_ON, the on-time ONTIME, the switching control signal SW_CTRL, the high-side transistor M1, and the low-side transistor M2 are illustrated.

When the output voltage $V_{OUT}$ lowers to the bottom level $V_{BOTTOM}$, the turn-on signal TURN_ON is asserted, and the switching control signal SW_CTRL becomes the on-level (here, high). Due to this, the high-side transistor M1 is turned on, and the low-side transistor M2 is turned off. Furthermore, measurement of the on-time $T_{ON}$ starts in such a manner that the assertion of the turn-on signal TURN_ON is the trigger for the start. Upon the elapse of the on-time $T_{ON}$, the on-time ONTIME is asserted, and the switching control signal SW_CTRL becomes the off-level (here, low). Due to this, the high-side transistor M1 is turned off, and the low-side transistor M2 is turned on. By repeating this operation, the output voltage $V_{OUT}$ is stabilized in a voltage range that depends on the bottom level $V_{BOTTOM}$.

Figure 3:
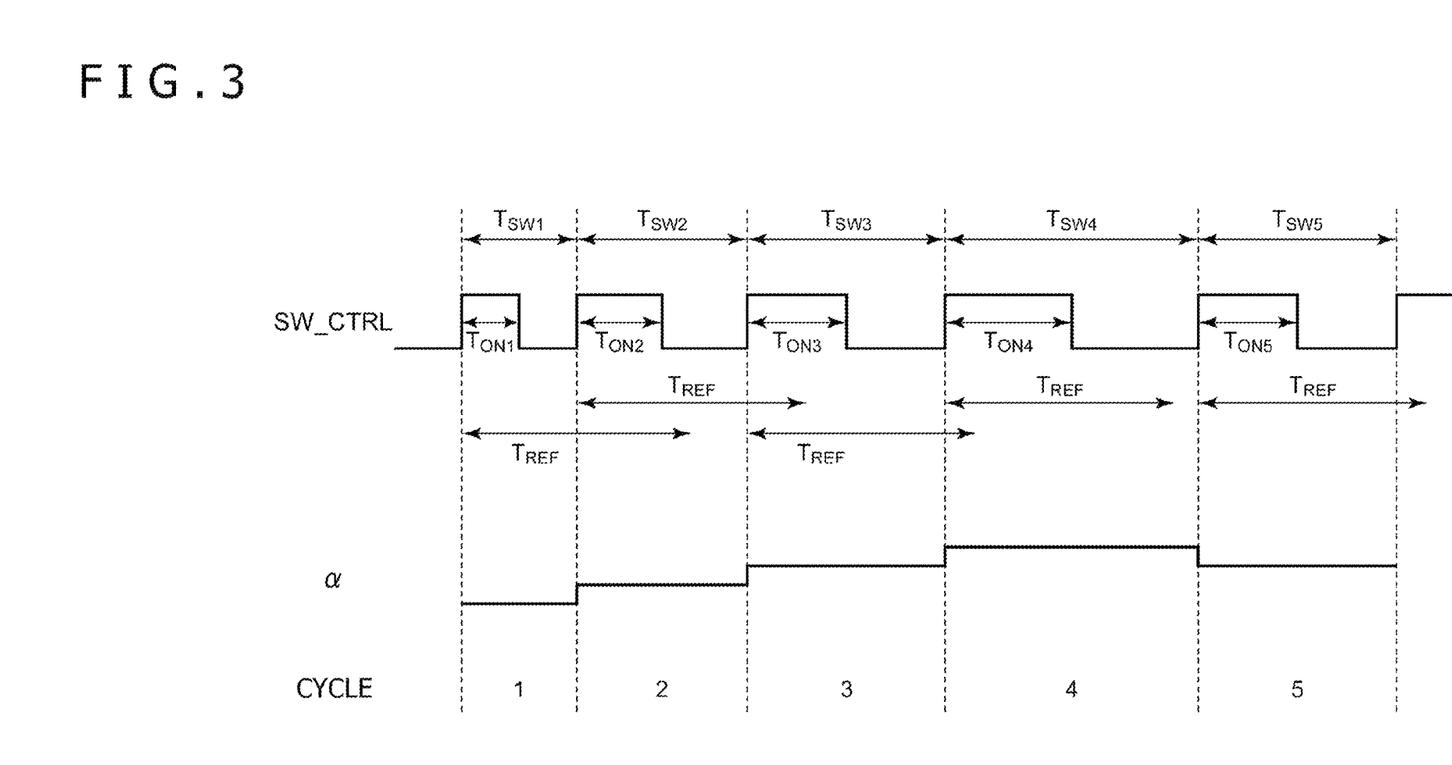
FIG. 3 is a diagram for explaining feedback control of the switching frequency.

Subsequently, feedback control of the switching frequency will be described. FIG. 3 is a diagram for explaining the feedback control of the switching frequency.

In each switching cycle, the switching period $T_{SWi}$ (i=1, 2, ...) is compared with the reference period $T_{REF}$.

In the first switching cycle, $T_{SW1} < T_{REF}$ is satisfied, and therefore α increases in the next cycle. As a result, the on-time $T_{ON2}$ in the second switching cycle becomes longer. As a result, the switching period $T_{SW2}$ also becomes longer than the period $T_{SW1}$ of the previous cycle.

Also in the second switching cycle, $T_{SW2} < T_{REF}$ is satisfied, and thus α further increases in the next cycle. As a result, the on-time $T_{ON3}$ in the third switching cycle becomes longer. As a result, the switching period $T_{SW3}$ also becomes longer than the period $T_{SW2}$ of the previous cycle.

Also in the third switching cycle, $T_{SW3} < T_{REF}$ is satisfied, and thus α further increases in the next cycle. As a result, the on-time $T_{ON4}$ in the fourth switching cycle becomes longer. As a result, the switching period $T_{SW4}$ also becomes longer than the period $T_{SW3}$ of the previous cycle.

In the fourth switching cycle, $T_{SW4} > T_{REF}$ is satisfied, and thus α decreases in the next cycle. As a result, the on-time $T_{ON5}$ in the fifth switching cycle becomes shorter than the on-time $T_{ON4}$ of the previous cycle. As a result, the switching period $T_{SW5}$ becomes shorter than the period $T_{SW4}$ of the previous cycle.

By repeating this operation, the switching period $T_{SW}$ can be stabilized for the reference period $T_{REF}$.

The above is the operation of the step-down converter 100.

When the switching period $T_{SW}$ is longer than the reference period $T_{REF}$, by decreasing the coefficient α, the on-time $T_{ON}$ becomes shorter and, as a result, the switching period $T_{SW}$ becomes shorter and can be brought closer to the reference period $T_{REF}$. Conversely, when the switching period $T_{SW}$ is shorter than the reference period $T_{REF}$, by increasing the coefficient α, the on-time $T_{ON}$ becomes longer, and the switching period $T_{SW}$ becomes longer and can be brought closer to the reference period $T_{REF}$. By carrying out this feedback control, the switching period $T_{SW}$ can be brought close to the reference period $T_{REF}$ irrespective of the magnitude of the on-resistance of the high-side transistor M1 and the low-side transistor M2, and a switching frequency $f_{sw}$, which is the reciprocal of the switching period $T_{SW}$, can be stabilized. This configuration has an advantage that a feedback system that involves complicated phase compensation, for example, a PLL circuit or a FLL circuit, is unnecessary.

The present disclosure is grasped as the block diagram or circuit diagram of FIG. 1 or covers various devices and methods derived from the above-described explanation, and is not limited to a specific configuration. More specific configuration examples and embodiment examples will be described below for the purpose of not narrowing the range of the present disclosure but assisting understanding the essence and operation of the present disclosure and clarifying them.

Figure 4:
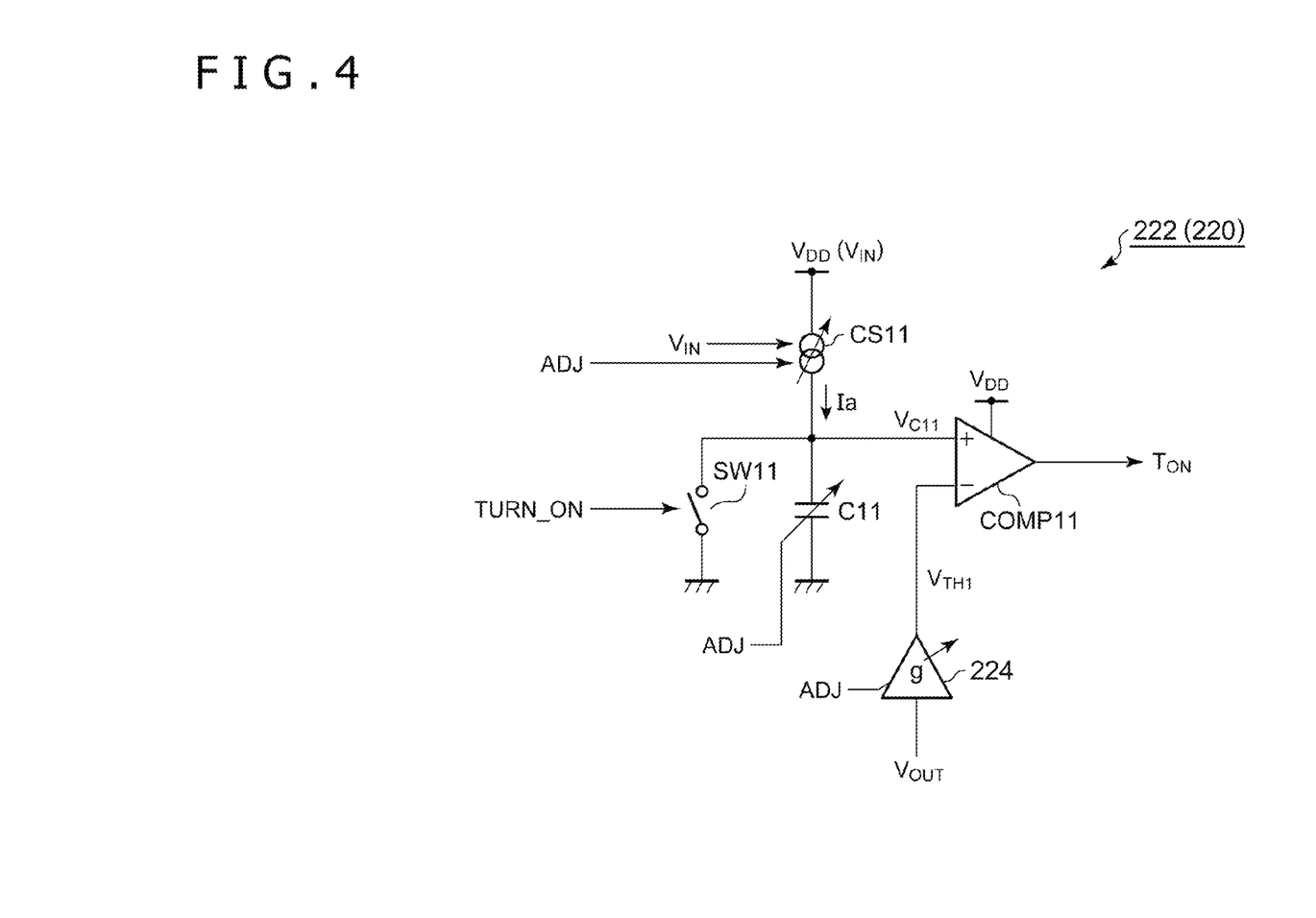
FIG. 4 is a circuit diagram illustrating a configuration example of an on-time generating circuit.

FIG. 4 is a circuit diagram illustrating a configuration example of the on-time generating circuit 220. The second timer circuit 222 includes a second capacitor C11, a second current source CS11, a second comparator COMP11, a second switch SW11, and a threshold voltage generating circuit 224.

One end of the second capacitor C11 is grounded. The second current source CS11 supplies, to the second capacitor C11, a current $Ia = \beta \cdot V_{IN}$ proportional to the input voltage $V_{IN}$ in such a manner that β is the proportional constant.

The threshold voltage generating circuit 224 generates a first threshold voltage $V_{TH1}$ proportional to the output voltage $V_{OUT}$. When the proportional constant is defined as g, $V_{TH1} = g \cdot V_{OUT}$ holds. The feedback signal $V_{FB}$ may be input to the threshold voltage generating circuit 224 as a signal that indicates the output voltage $V_{OUT}$. Alternatively, a switching voltage $V_{SW}$ of the switching pin SW may be input to the threshold voltage generating circuit 224. The threshold voltage generating circuit 224 may include a low-pass filter that smoothes the switching voltage $V_{SW}$.

The second comparator COMP11 compares a voltage $V_{C11}$ of the second capacitor C11 with the first threshold voltage $V_{TH1}$ proportional to the output voltage $V_{OUT}$. The output of the second comparator COMP11 can be deemed as the on-time ONTIME.

The second switch SW11 is controlled by the turn-on signal TURN_ON or a signal other than it. When the second switch SW11 is in the on-state, the voltage $V_{C11}$ of the second capacitor C11 is initialized to 0 V.

When the turn-on signal TURN_ON is asserted, the second switch SW11 is once turned on and thereafter is turned off. When the second switch SW11 is turned off, the voltage $V_{C11}$ of the second capacitor C11 increases from 0 V along with the elapse of a time t with a constant slope Ia/C11 proportional to the current Ia, i.e. with the slope $Ia/C11 = \beta \cdot V_{IN}/C11$.

$$V_{C11} = Ia/C11 \times t = (\beta \cdot V_{IN}/C11) \times t \tag{5}$$

Then, when the voltage $V_{C11}$ reaches the threshold voltage $V_{TH1}$ after the elapse of a certain time (i.e. on-time $T_{ON}$), the on-time ONTIME is asserted. Therefore, Expression (6) holds.

$$(\beta \cdot V_{IN}/C11) \times T_{ON} = g \cdot V_{OUT} \tag{6}$$

Therefore, the on-time $T_{ON}$ measured by the second timer circuit 222 is represented by Expression (7).

$$T_{ON} = (g \cdot C11/\beta) \times V_{OUT}/V_{IN} \qquad (7)$$

That is, $\alpha = (g \cdot C11/\beta)$ is obtained.

Therefore, the second timer circuit 222 is configured to allow at least one of g, C11, and $\beta$ to change according to the adjustment signal ADJ.

The adjustment signal ADJ may be input to the second current source CS11, and $\beta$ may be changed according to the adjustment signal ADJ. Alternatively, the second capacitor C11 may include variable capacitance, and the capacitance value C11 may be allowed to be controlled according to the adjustment signal ADJ. Alternatively, the gain g of the threshold voltage generating circuit 224 may be variably configured, and the gain g may be allowed to be controlled according to the adjustment signal ADJ. In a case of controlling the capacitance of the second capacitor C11 or the gain g, it needs to be controlled with the polarity opposite to $\beta$.

The configuration that controls $\beta$ of the second current source CS11 will be described.

Figure 5:
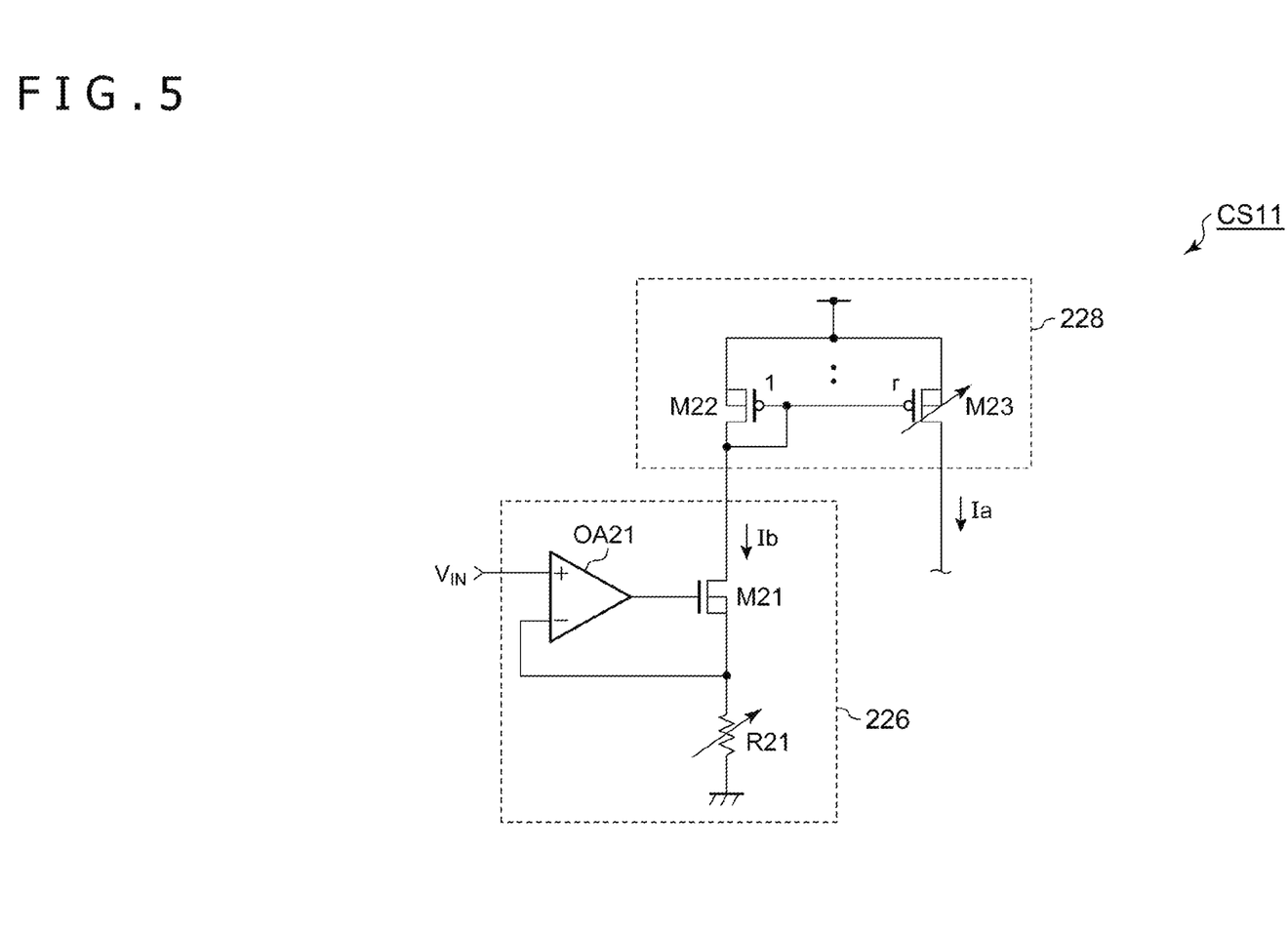
FIG. 5 is a circuit diagram illustrating a configuration example of a second current source.

FIG. 5 is a circuit diagram illustrating a configuration example of the second current source CS11. The second current source CS11 includes a voltage-current conversion circuit (V/I conversion circuit) 226 and a current amplifying circuit 228. The V/I conversion circuit 226 includes a resistor R21 and generates a current Ib that is proportional to the input voltage $V_{IN}$ and is inversely proportional to the resistance value of the resistor R21.

$$Ib = V_{IN}/R21$$

For example, the V/I conversion circuit 226 includes an operational amplifier OP21, a transistor M21, and the resistor R21.

The current amplifying circuit 228 amplifies the current Ib by a gain $\gamma$ to generate the current Ia. For example, the current amplifying circuit 228 may be a current mirror circuit including transistors M22 and M23, and the size ratio of the transistors M22 and M23 is the current amplification factor $\gamma$.

In this second current source CS11, Expression (8) holds.

$$Ia = Ib \times \gamma = V_{IN}/R21 \times \gamma \qquad (8)$$

That is, $\beta = \gamma/R21$ is obtained. Therefore, for controlling it suffices that the resistance value of the resistor R21 is made variable or the size of the transistor M23 (or M22) is variably configured.

Figure 6:
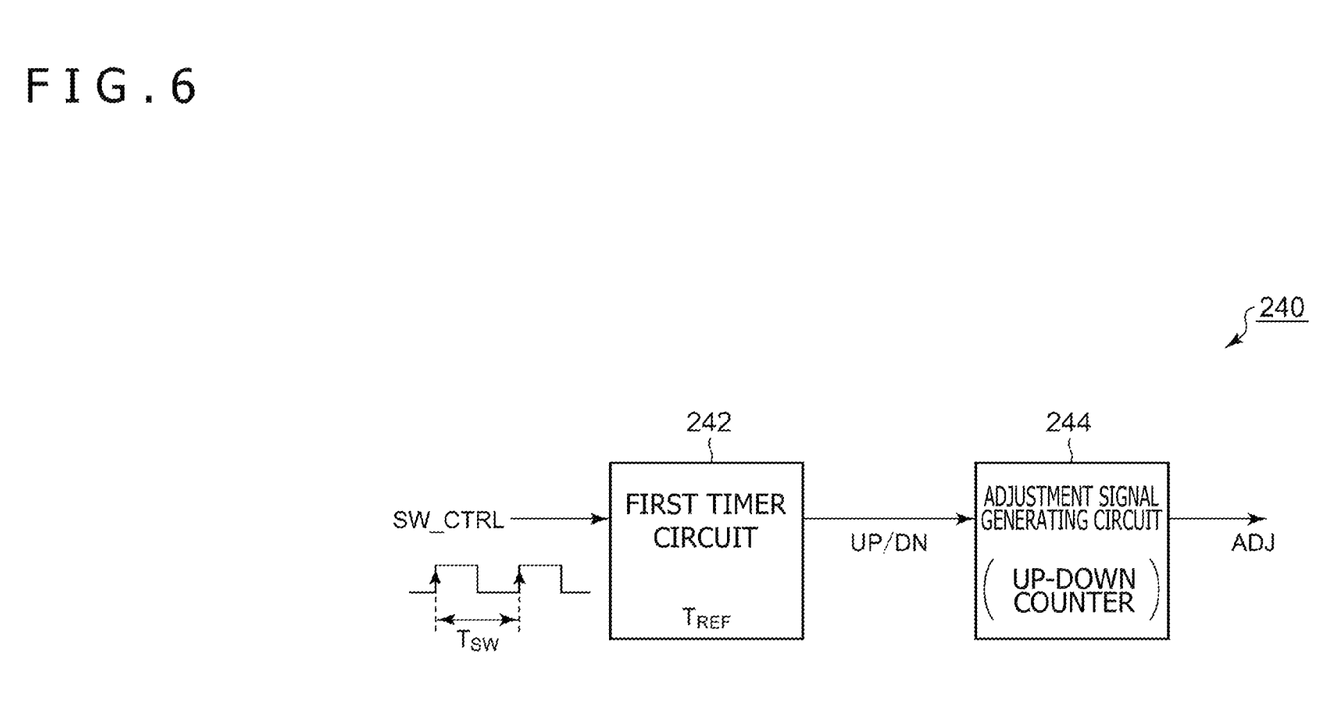
FIG. 6 is a block diagram illustrating a configuration example of an on-time correcting circuit.

Subsequently, the configuration of the on-time correcting circuit 240 will be described.

FIG. 6 is a block diagram illustrating a configuration example of the on-time correcting circuit 240. The on-time correcting circuit 240 includes a first timer circuit 242 and an adjustment signal generating circuit 244.

The first timer circuit 242 receives the switching control signal SW_CTRL having the switching period $T_{SW}$ and starts measurement of the reference period $T_{REF}$ in such a manner that a specific edge (one of a positive edge and a negative edge, hereinafter, the positive edge is employed) of the switching control signal SW_CTRL is the trigger for the start.

The on-time correcting circuit 240 generates a down signal DN when the next specific edge (positive edge) of the switching control signal SW_CTRL occurs before the first timer circuit 242 completes the measurement of the reference period $T_{REF}$. Furthermore, the on-time correcting circuit 240 generates an up signal UP when the measurement of the reference period $T_{REF}$ is completed before the next specific edge of the switching control signal SW_CTRL occurs.

The adjustment signal generating circuit 244 generates the adjustment signal ADJ that increases and decreases according to the up signal UP and the down signal DN.

When the adjustment signal ADJ is a digital signal, the adjustment signal generating circuit 244 can be configured by an up-down counter. When an analog signal is employed as the adjustment signal ADJ, the adjustment signal generating circuit 244 may be configured by a charge pump.

Figure 7:
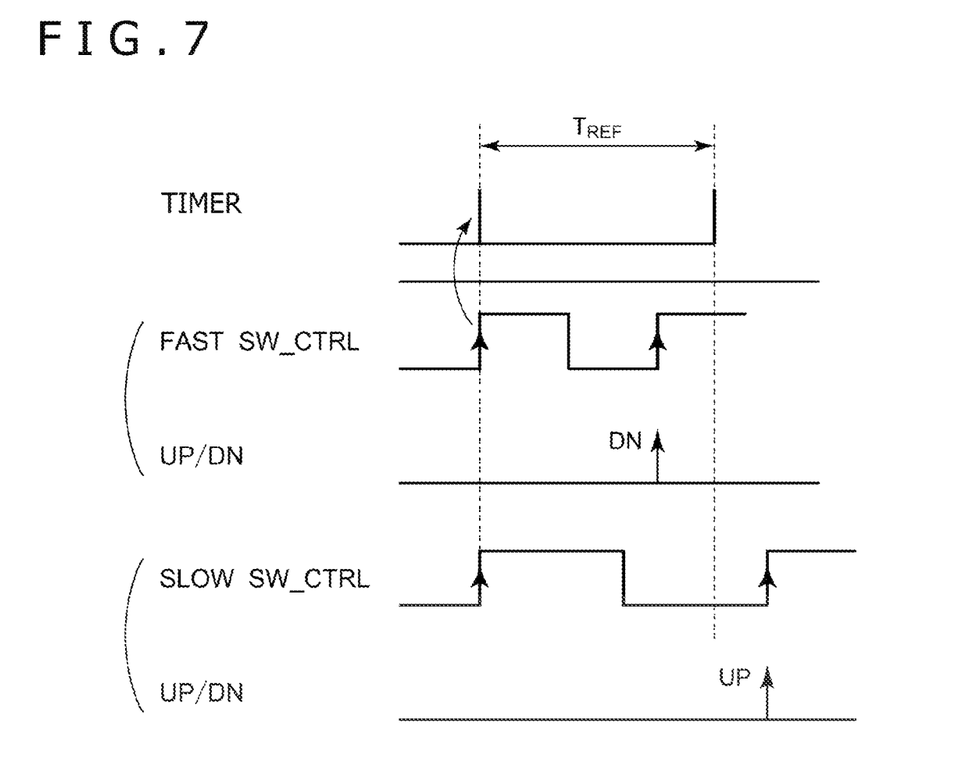
FIG. 7 is a diagram for explaining operation of the on-time correcting circuit of FIG. 6.

FIG. 7 is a diagram for explaining operation of the on-time correcting circuit 240 of FIG. 6. A case in which the switching frequency is fast is illustrated on the upper stage, and a case in which the switching frequency is slow is illustrated on the lower stage. The first timer circuit 242 starts the timer in such a manner that a positive edge E1 of the switching control signal SW_CTRL is the trigger for the start. When the switching frequency is fast as in the upper stage, the next edge E2 occurs before the elapse of $T_{REF}$, and therefore the down signal DN is generated.

When the switching frequency is slow as in the lower stage, the measurement of $T_{REF}$ is completed (time is up) before the next edge E2 occurs, and therefore the up signal UP is generated.

Figure 8:
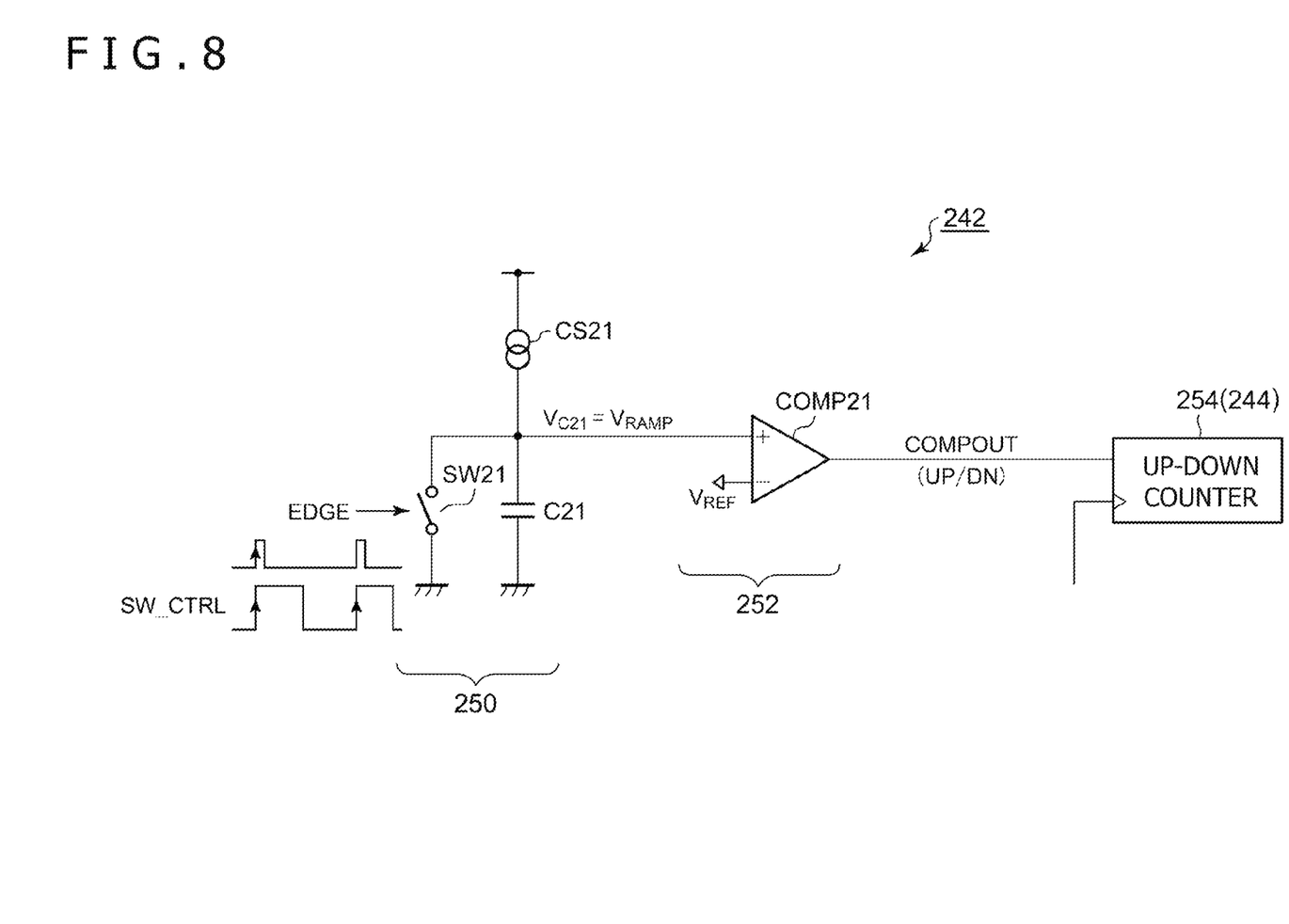
FIG. 8 is a circuit diagram illustrating a configuration example of a first timer circuit.

FIG. 8 is a circuit diagram illustrating a configuration example of the first timer circuit 242.

The first timer circuit 242 includes a ramp signal generating circuit 250 and a comparison circuit 252.

The ramp signal generating circuit 250 generates a ramp signal $V_{RAMP}$. This ramp signal $V_{RAMP}$ has a constant slope and is reset in response to the specific edge (positive edge) of the switching control signal SW_CTRL.

The comparison circuit 252 generates the down signal DN when the ramp signal $V_{RAMP}$ is reset before reaching the reference value $V_{REF}$ corresponding to the reference period $T_{REF}$, and generates the up signal UP when the ramp signal $V_{RAMP}$ reaches the reference value $V_{REF}$ before being reset.

The ramp signal generating circuit 250 includes a first current source CS21, a first capacitor C21, and a first switch SW21.

The first current source CS21 generates a constant current Ic. The first switch SW21 is controlled according to an edge detection signal EDGE that is a pulse based on the specific edge (positive edge) of the switching control signal SW_CTRL. The edge detection signal EDGE may be the turn-on signal TURN_ON. A voltage $V_{C21}$ of the capacitor becomes the ramp signal $V_{RAMP}$.

The comparison circuit 252 may include a first comparator COMP21. The first comparator COMP21 compares the ramp signal $V_{RAMP}$ with the reference value $V_{REF}$. When an output (comparison signal) COMPOUT of the first comparator COMP21 is low during one switching period, the comparison signal COMPOUT represents the down signal DN. When making a transition to the high level in one switching period, the comparison signal COMPOUT represents the up signal UP.

The adjustment signal generating circuit 244 at the latter stage includes an up-down counter 254. The up-down counter 254 carries out counting-up in a cycle in which the comparison signal COMPOUT is high, and carries out counting-down in a cycle during which the comparison signal COMPOUT is low.

The first timer circuit 242 of FIG. 8 has basically the same configuration as the second timer circuit 222 of the on-time generating circuit 220. In this case, it is preferable that the circuit elements corresponding to each other (C11 and C21, SW11 and SW21, CS11 and CS21) are disposed close to each other on a semiconductor chip to cause the relative variation of the circuit constant to become small.

Figure 9:
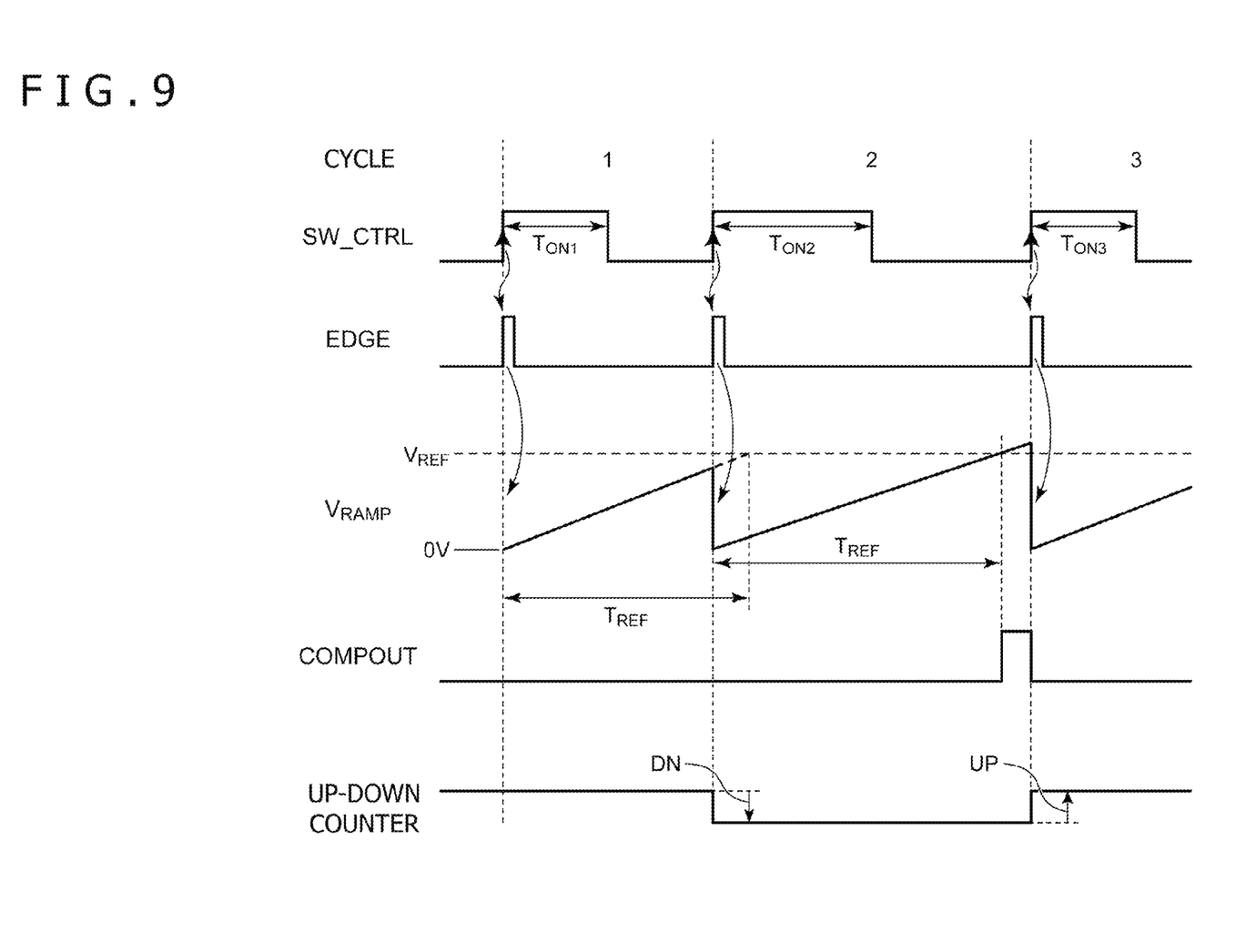
FIG. 9 is an operation waveform diagram of the first timer circuit of FIG. 8.

FIG. 9 is an operation waveform diagram of the first timer circuit 242 of FIG. 8. In the first cycle, the switching period $T_{SW1}$ is shorter than the reference period $T_{REF}$, and therefore the ramp signal $V_{RAMP}$ does not reach the reference value $V_{REF}$. Thus, the comparison signal COMPOUT is low, that is, the down signal DN is generated. As a result, the count value of the up-down counter 254 decreases.

When the count value of the up-down counter 254 is what represents the switching frequency, the above-described coefficient α is controlled with the polarity opposite to the count value of the up-down counter 254. That is, when the count value of the up-down counter 254 decreases, the on-time $T_{ON2}$ of the second cycle becomes longer than the on-time $T_{ON1}$ of the first cycle, and the switching period $T_{SW2}$ also becomes longer as a result.

Suppose that the switching period $T_{SW2}$ becomes longer than the reference period $T_{REF}$ as the result of the extension of the on-time $T_{ON2}$. In this case, the ramp signal $V_{RAMP}$ exceeds the reference value $V_{REF}$. Thus, the comparison signal COMPOUT is high, that is, the up signal UP is generated. Due to this, the count value of the up-down counter 254 increases.

(Use Purposes)

Figure 10:
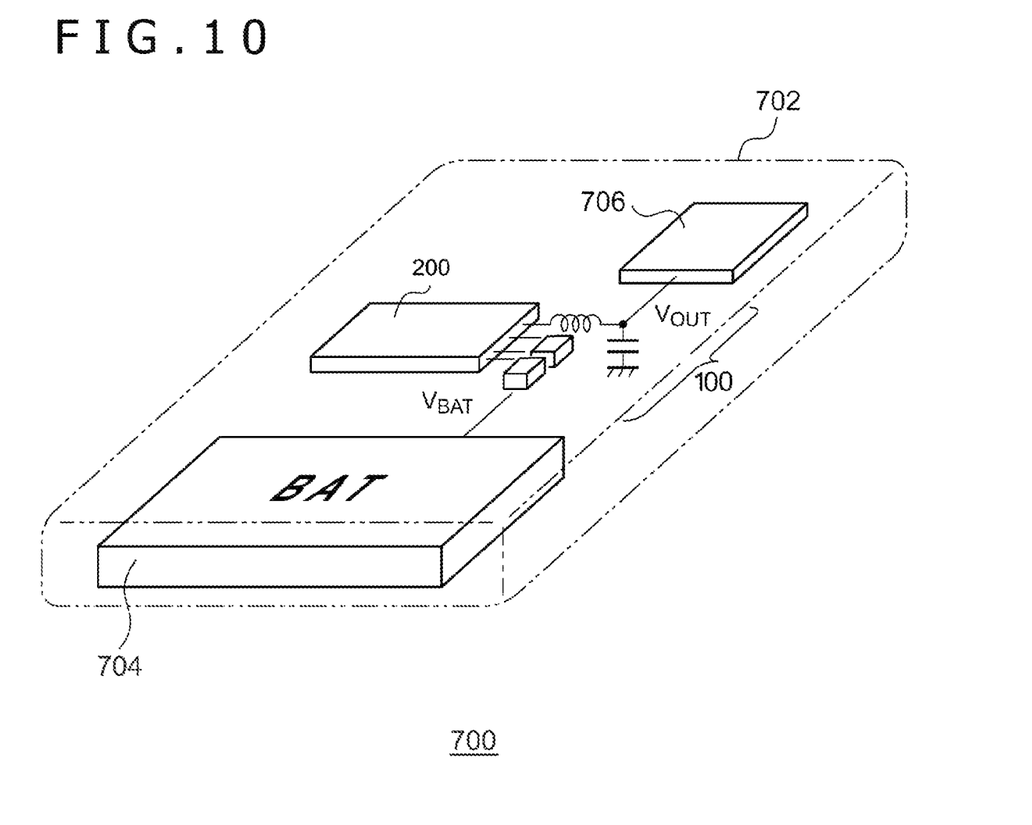
FIG. 10 is a diagram illustrating one example of electronic equipment including the step-down converter according to the embodiment.

FIG. 10 is a diagram illustrating one example of electronic equipment 700 including the step-down converter 100 according to the embodiment. For example, the electronic equipment 700 is a device of a battery-driven type, such as a mobile phone terminal, a digital camera, a digital video camera, a tablet terminal, or a portable audio player. The electronic equipment 700 includes a casing 702, a battery 704, a microprocessor 706, and the step-down converter 100. The step-down converter 100 receives a battery voltage $V_{BAT}$ (=$V_{IN}$) from the battery 704 at an input terminal thereof and supplies the output voltage $V_{OUT}$ to the microprocessor 706 connected to an output terminal or other loads.

The kind of electronic equipment 700 is not limited to the device of the battery-driven type and may be in-vehicle equipment and may be OA equipment such as a facsimile machine and may be industrial equipment.

It is understood by those skilled in the art that the embodiments are exemplification and various modification examples exist in combinations of the respective constituent elements and the respective processing processes of them and that such modification examples are also included in the present disclosure and can configure the range of the present disclosure.

What is claimed is:

1. A control circuit of a step-down converter, the control circuit comprising:
    a bottom detecting circuit that asserts a turn-on signal when an output voltage of the step-down converter falls below a bottom level;
    an on-time generating circuit that includes a second timer circuit capable of measuring an on-time $T_{ON}$ in such a manner that the assertion of the turn-on signal is a trigger for the measurement, and is configured to obtain a relation of $T_{ON}=\alpha \cdot V_{OUT}/V_{IN}$ when an input voltage of the step-down converter is defined as $V_{IN}$, the output voltage is defined as $V_{OUT}$, and a controllable coefficient is defined as α;
    a control logic that sets a high-side transistor to an on-state during the on-time $T_{ON}$ from the assertion of the turn-on signal and subsequently sets a low-side transistor to an on-state until the turn-on signal is asserted next; and
    an on-time correcting circuit that decreases the coefficient α when a switching period of the control logic is longer than a reference period, and increases the coefficient α when the switching period of the control logic is shorter than the reference period.

2. The control circuit according to claim 1, wherein
    the on-time correcting circuit includes a first timer circuit that receives a switching control signal having the switching period of the control logic and starts measurement of the reference period in such a manner that a specific edge of the switching control signal is a trigger for the start,
    the first timer circuit generates a down signal when the specific edge that is next in the switching control signal occurs before the measurement of the reference period is completed, and generates an up signal when the measurement of the reference period is completed before the specific edge that is next in the switching control signal occurs, and
    the on-time correcting circuit changes the coefficient α on a basis of the up signal and the down signal.

3. The control circuit according to claim 2, wherein
    the specific edge is an edge corresponding to turning-on of the high-side transistor.

4. The control circuit according to claim 2, wherein
    the first timer circuit includes
        a ramp signal generating circuit that generates a ramp signal that has a slope and is reset in response to the specific edge of the switching control signal, and
        a comparison circuit that generates the down signal when the ramp signal is reset before reaching a reference value corresponding to the reference period, and generates the up signal when the ramp signal reaches the reference value before being reset.

5. The control circuit according to claim 2, wherein
    the on-time correcting circuit further includes an adjustment signal generating circuit that generates an adjustment signal that increases and decreases according to the up signal and the down signal, and controls the coefficient α according to the adjustment signal.

6. The control circuit according to claim 5, wherein
    the adjustment signal generating circuit is an up-down counter that carries out counting-up in response to the up signal and carries out counting-down in response to the down signal.

7. The control circuit according to claim 1, wherein
    the second timer circuit includes
        a capacitor,
        a current source that supplies a current $Ia=\beta \cdot V_{IN}$ proportional to the input voltage $V_{IN}$ to the capacitor in such a manner that β is a proportional constant, and
        a comparator that compares a voltage of the capacitor with a threshold voltage proportional to the output voltage $V_{OUT}$.

8. The control circuit according to claim 7, wherein
    the on-time correcting circuit changes the proportional constant β.

9. The control circuit according to claim 7, wherein
    the current source includes
        a voltage-current conversion circuit that includes a resistor R and generates a current $Ib=V_{IN}/R$ that is proportional to the input voltage $V_{IN}$ and is inversely proportional to a resistance value of the resistor R, and a current amplifying circuit that amplifies the current Ib by a gain γ to generate the current Ia.

10. The control circuit according to claim 9, wherein
the resistor R is a variable resistor, and the on-time correcting circuit changes the resistance value of the resistor R.

11. The control circuit according to claim 9, wherein
the gain γ of the current amplifying circuit is variable, and the on-time correcting circuit changes the gain γ.

12. The control circuit according to claim 9, wherein
the on-time generating circuit includes a threshold voltage generating circuit that generates the threshold voltage obtained by multiplying the output voltage $V_{OUT}$ by a gain g, and
the on-time correcting circuit changes the gain g.

13. The control circuit according to claim 12, wherein
the threshold voltage generating circuit includes a filter that smoothes a switching voltage generated at a connecting node of the high-side transistor and the low-side transistor.

14. The control circuit according to claim 1, wherein
the control circuit is monolithically integrated on one semiconductor substrate.

15. A step-down converter comprising:
the control circuit according to claim 1.

16. Electronic equipment comprising:
the control circuit according to claim 1.

* * * * *